(12) United States Patent
Wiedenmann et al.

(10) Patent No.: US 8,528,584 B2
(45) Date of Patent: Sep. 10, 2013

(54) DEVICE FOR DRIVING A DOUBLE SEAT VALVE

(75) Inventors: Willi Wiedenmann, Riesbuerg (DE); Martin Sauer, Altisheim (DE)

(73) Assignee: Krones AG, Neutraubling (DE)

(*) Notice: Subject to any disclaimer, the term of this patent is extended or adjusted under 35 U.S.C. 154(b) by 192 days.

(21) Appl. No.: 13/164,803

(22) Filed: Jun. 21, 2011

(65) Prior Publication Data

US 2011/0309282 A1 Dec. 22, 2011

(30) Foreign Application Priority Data

Jun. 21, 2010 (DE) .......................... 10 2010 030 299

(51) Int. Cl.
*F16K 1/00* (2006.01)

(52) U.S. Cl.
USPC ...................... 137/240; 137/614.18; 251/63.5

(58) Field of Classification Search
USPC .............. 137/240, 238, 618.17, 614.19, 312; 251/324, 63.5, 63.6
See application file for complete search history.

(56) References Cited

U.S. PATENT DOCUMENTS

| | | | |
|---|---|---|---|
| 6,014,893 A * | 1/2000 | Reed et al. ...................... | 73/49.7 |
| 6,230,736 B1 * | 5/2001 | Scheible et al. .............. | 137/240 |
| 7,191,791 B2 * | 3/2007 | Burmester ............... | 137/614.18 |

FOREIGN PATENT DOCUMENTS

| | | |
|---|---|---|
| DE | 4243111 A1 | 6/1994 |
| DE | 29714924 U1 | 10/1997 |
| DE | 10237236 B3 | 2/2004 |
| EP | 1525415 A1 | 4/2005 |
| WO | WO-2005093298 A1 | 10/2005 |
| WO | WO-2005093299 A1 | 10/2005 |

OTHER PUBLICATIONS

German Search Report for DE 10 2010 030 299.6, dated Jun. 6, 2011.

* cited by examiner

*Primary Examiner* — Kevin Lee
(74) *Attorney, Agent, or Firm* — Leydig, Voit & Mayer, Ltd.

(57) ABSTRACT

A drive device for a double seat valve having, between flow paths, a seat and first and second valve disks, where first, second and third pistons movable in a sealed manner by alternating pressure pulses for initiating an opening cycle and cleaning cycles of the valve disks each are provided in a drive device housing, where the pistons can be selectively connected with valve disk couple elements so as to transmit movements. Pressure transmission paths lead into the drive device housing to chambers defined by the pistons, the second piston being guided in a sealed manner separate from the first piston in the drive device housing, sealing areas of the first and second pistons define a first chamber in the drive device housing, and at least one pressure transmission path leads, for the cleaning cycle of the second valve disk, laterally and transversely to the common axis of the drive device housing and the valve chamber at least directly into the first chamber.

23 Claims, 12 Drawing Sheets

DEVICE FOR DRIVING A DOUBLE SEAT VALVE

CROSS-REFERENCE TO RELATED APPLICATION

The present application claims the benefit of priority of German Application No. 102010030299.6, filed Jun. 21, 2010. The entire text of the priority application is incorporated herein by reference in its entirety.

FIELD OF THE DISCLOSURE

The disclosure relates to a drive device used for double seat valves.

BACKGROUND

Such double seat valves are not only used in the food industry, but for example also for cosmetic or medical products, to connect flow paths or reliably separate them from each other, where e.g. in case of a product change or after certain operating times, external and/or internal cleaning cycles must be performed. Here, important requirements on the double seat valve have to be met, among other things in that there does not occur any communication between the flow paths in the closed state of the double seat valve and during cleaning cycles, that any leakage that might occur in the closed state under no circumstances get from the one flow path to the other one, that no uncontrolled loss of the separation of the flow paths can occur in cleaning cycles, and that, in the cleaning cycles using a cleaning medium, all components of the double seat valve that have come into contact, for example, with food, a leakage or the cleaning medium, can be perfectly cleaned, optionally even under aseptic conditions.

At least two different types of double seat valves are common. In the one type, the first valve disk fulfills a seat valve function with an axial or an axial and radial seal in the or at the seat, while the other valve disk provides a sliding valve function with an only radial seal in the seat. In the other type, which is suitable, for example, in aseptic conditions, however, the second valve disk also provides a seat valve function with an axial or an axial and radial seal. In the closed state of the double seat valve, the two valve disks together define a leakage space in the seat which can be connected with the external surroundings, receives possible leakages and thus prevents leakage from getting from one flow path into the other one. During the opening cycle, the second valve disk initially starting with its opening movement takes along the first valve disk, while the leakage space is sealed to the outside by a central seal as soon as both valve disks depart from the seat and the flow paths are connected. The closing cycle of the double seat valve is usually performed by spring assemblies which act at least on two of the three pistons. For the double seat valve type in which the second valve disk provides the sliding valve function, the first piston acts as main piston for the opening cycle, while the second and the third pistons are provided as vent pistons for the cleaning cycles of both valve disks. In the double seat valve type whose second valve disk also provides a seat valve function, the first piston acts as main piston for the opening cycle and optionally as vent piston for a cleaning cycle of a valve disk, while the third piston functions as vent piston for the cleaning cycle of the other valve disk, and the second piston secures the valve disk not subjected to a cleaning cycle in the closed position and limits the stroke during the cleaning cycle of the one valve disk. There are important requirements on the drive device in that short switching times are achieved in particular in the cleaning cycles, that the drive device is constructed in a manner as compact as possible as the space in the surrounding area of such double seat valves is often very restricted, and that exactly defined vent positions of each valve disk during the cleaning cycle and a preferably low pressure medium consumption in the cycles can be achieved. Normally, compressed air is used as pressure medium for controlling the drive device.

In the drive device known from DE 42 43 111 A for an aseptic double seat valve, the second piston is guided to be movable inside the first piston in a sealed manner in the drive device housing, so that the first chamber is defined between the first and the second pistons. The pressure transmission path into the first chamber extends through the space in the drive device housing which contains the main spring assembly. This does not only result in an undesired long switching time during the cleaning cycle as pressure builds up with some delay in the large space, but also in a high consumption of compressed air combined with a vent position of the valve disk which is in an undesired manner defined depending on time.

Drive devices known from WO 2005/093298 A and WO 2005/093299 A can be optionally used for both types of double seat valves mentioned in the beginning by rearranging several components of the drive device located inside. The second piston is movable inside the first piston in a sealed manner and together with the first piston defines the first chamber. In one embodiment, the pressure transmission path extends centrally through the drive device housing and across several flow deflections into the first chamber. In another embodiment, the pressure transmission path extends laterally into the drive device into the first chamber, though not directly into the first chamber but across several deflections and through the first piston.

Drive devices known from DE 10 237 236 A and EP 1 525 415 A each for only one double seat valve type comprise two drive device housings placed one after the other in the axial direction of the complete assembly of drive device and double seat valve, the housings being connected to each other in a sealed manner, one of the housings containing the main spring assembly and the first piston, and the other one containing another spring assembly and the second and third pistons and three pressure transmission paths. The pressure transmission path to the first chamber extends centrally axially through the one drive device housing pointing away from the double seat valve. The drive device is structurally complicated and occupies an unsuitably large overall size in the axial direction.

SUMMARY OF THE DISCLOSURE

One aspect of the disclosure is to provide a drive device of the type mentioned in the beginning which is structurally simple, compact in the axial direction, fail-safe and fast switching, where it is intended that the drive device can be optionally universally used for various double seat valve types.

The sealed guidance of the second piston structurally separated from the first piston in the single drive device housing which also contains the first piston represents a structural simplification as the first piston can have a simple design. Functional reliability is increased as reaction forces from the kinetic resistance of the second piston do not affect adjusting movements of the first piston. As the first chamber is limited by the sealing areas of the first and the second pistons in the drive device housing, which act structurally separated from one another, the pressure transmission path for the cleaning cycle of the second valve disk can be very easily guided laterally and transversely to the common axis of the drive device housing and the valve chamber directly into the first chamber. This results in a short switching time and a low consumption of pressure medium for the cleaning cycle, as concerns pressure build-up and venting, and in a high functional reliability as the vent position of the second valve disk during the cleaning cycle is perfectly defined. Furthermore, a shorter overall length in the axial direction is required.

In one suitable embodiment, the drive device housing is divided at least into an upper housing part and a central housing part. In the central housing part, a guide ring is provided (integrated or inserted) which, as compared to the guiding and sealing diameter for the first piston in the upper housing part, defines a smaller guiding and sealing diameter for the second piston. The guiding and sealing diameter for the second piston can be adapted in response to the ratio of the pistons with respect to each other from the guiding and sealing diameter of the first piston to a preferably short switching time during the cleaning cycle and the force required for this. The at least one pressure transmission path to the first chamber extends through the central housing part or the guide ring directly into the first chamber. The pressure transmission path can be designed such that as little throttle losses as possible arise during pressure build-up or venting, respectively.

In one suitable embodiment, the axial sealing and guiding length for the second piston in the guide ring is shorter than the shift stroke of the second piston during the opening cycle. This means that during the opening cycle, the second piston is guided in a sealed and braked manner only over an initially short stroke distance, but then freely travels along with the first piston. Over the major portion of the opening cycle, this results in an advantage in that reaction forces from the shift resistance of the second piston do not affect the opening cycle controlled by the first piston, and that the times of the opening and closing cycles are shortened. The guide ring thus guides the second piston in a sealed manner only over the stroke distance that is required for the cleaning cycle of the second valve disk, either to bring the second valve disk directly into the required vent position for the cleaning cycle, or to secure the first valve disk in the closed position and limit the vent stroke distance during the cleaning cycle of the second valve disk.

In one suitable embodiment, a conical introduction inclination for the second piston or its seal is provided to define the guiding and sealing length for the second piston in the guide ring and for an easier reentry of the second piston in the guide ring during the closing cycle.

In another preferred embodiment, a lower housing part is suitably joined with the central housing part containing the guide ring in a sealed manner which comprises the third piston and a third chamber. The guiding and sealing diameter of the third piston in the lower housing part can correspond to the guiding and sealing diameter of the first or second piston, or suitably be even smaller than that of the second piston (reduced consumption of pressure medium and shorter switching time).

Suitably, sealing areas of the second and the third pistons in the guide ring and in the lower housing part define a second chamber between them. Here, it can be suitable if separate pressure transmission paths lead laterally through the guide ring and the lower housing part directly into the second and third chambers. This design also contributes to short switching times of the drive device.

A particularly suitable embodiment of the drive device according to the disclosure is designed such that the pressure transmission paths to the first and second chambers start from a valve common to them. The valve has two separate external connections, contains a pressure-controlled shuttle valve and can preferably be mounted laterally outside at the drive device housing or the central housing part, respectively, to achieve short pressure transmission paths. This valve does not only have the job of taking care of the pressure build-up for the respective cycle, but also of simultaneously taking care of the respective venting of displaced pressure medium from a chamber getting smaller during the cycle. This common valve is structurally simple, fail-safe and inexpensive. However, it is not intended to exclude that the common valve is designed without pressure-controlled shuttle valve as a multi-port solenoid valve which optionally has one single external supply pressure connection and a return connection as well as two outlets to the first and the second chambers and is switched over not by pressure control, but by magnetic control for the respective cycle.

In one suitable embodiment, the shuttle valve contains a control piston movable in a sealed manner in the common valve in a control chamber separately communicating with the two external connections and via chamber outlets with the first and second chambers. This control piston can be switched between at least two switching positions depending on the pressure admission to the one or the other external connection. In the one switching position, the one external connection is connected simultaneously with the two chamber outlets, while preferably the other external connection is shut off towards the chamber outlets. In this manner, the forces of the second piston are neutralized and the first piston is acted on, as it is suitable for a double seat valve with a second valve disk providing a sliding valve function. In the other switching position, the chamber outlet to the first chamber is connected with the other external connection to push away the second piston from the first piston by pressure admission to the first chamber, while the chamber outlet to the second chamber is optionally connected with the one external connection to vent the second chamber via the control chamber.

In another embodiment in which the common valve with the shuttle valve is designed for a double seat valve with a second valve disk providing a seat valve function, the shuttle valve contains a control piston movable in a sealed manner in a control chamber separately communicating with the two external connections and via chamber outlets with the first and the second chambers. This control piston can be switched between two switching positions depending on the pressure admission of the one or the other external connection. In the one switching position, the chamber outlet to the second chamber is connected with the one external connection, and the chamber outlet to the first chamber to the other external connection is shut off. Thus, when pressure is admitted to the second chamber, pressure only acts on the second piston in the direction towards the first piston. In the second switching position, the chamber outlet to the second chamber is connected with the one external connection, and the chamber outlet to the first chamber is connected with the other external outlet to build up pressure in the first chamber and displace the second piston away from the first piston, and to simultaneously optionally vent the second chamber. In order to admit pressure also to the first piston when pressure is only admitted to the second chamber, e.g. for the opening cycle, at least one seal shutting off in the direction of flow from the first to the second chamber and being open in the opposed direction of flow is provided in this embodiment in the sealing area of the second piston, so that, when pressure is only admitted to the second chamber, this pressure propagates past the first piston into the first chamber, and the forces of the first piston are neutralized in this manner. This seal can be, for example, a groove ring seal arranged in a ring groove of the second piston, e.g. its outer periphery, which acts like a check valve. As an alternative, in a seal of the second piston shutting off in both directions of flow, at least one check valve could be provided for this function in the second piston, too.

In one suitable embodiment of the drive device for the one double seat valve type, the first valve disk for a seat valve function comprises an axial or an axial and radial seal for a face of the seat, and the second valve disk for a sliding valve function comprises an only radial seal at a for example cylindrical inner wall in the seat.

In an alternative embodiment, in the other double seat valve type controllable by the drive device, the first valve disk for a seat valve function comprises an axial or an axial and radial seal for a face of the seat, while the second valve disk comprises, also for a seat valve function in the seat, an axial or an axial and a radial seal for another face in the seat. The drive device can thus be universally used optionally for both types of double seat valves, possibly after some slight modifications.

In another preferred embodiment, in the double seat valve of the one type, the second valve disk with the only radial seal is, during the cleaning cycle, driven out of the seat by the drive device via the second piston in the direction pointing away from the drive device housing over a predetermined stroke distance into a gap position by admitting pressure to the first chamber, while the first valve disk still keeps the seat closed. In the other double seat valve type controlled by the drive device, however, the second valve disk with an axial or an axial and radial seal is, during the cleaning cycle, lifted in the seat via the first piston over a predetermined stroke distance towards the drive device housing to a defined gap position by admitting pressure at least to the first chamber, while the first valve disk simultaneously keeps the seat closed. Here, the second piston acts in such a way that it limits the cleaning cycle stroke and simultaneously takes care that the first valve disk is reliably held in the closed position.

To get along with moderate actuation forces for the valve disks, it is suitable for the first and the second valve disks in the valve chamber to be pressure-compensated with respect to the pressures in the flow paths. This can be important above all when in the closed position of the double seat valve, clearly different pressures prevail in the flow paths.

In another suitable embodiment, the first and second pistons are equipped with a bell body each at their sides pointing away from the valve housing, where the bell bodies are interlocked like a telescope. The bell body of the second piston arranged inside the bell body of the first piston accommodates a passive spring assembly acting in the closing direction of the first valve disk. To reduce the axial overall length, the passive spring assembly overlaps in the axial direction at least with a portion of its axial extension with the axial extension of a closing spring assembly which acts on the first piston in the drive device housing in the closing direction of the double seat valve. The two bell bodies, having a reduced overall length, permit to use relatively long spring assemblies in the axial direction that can have largely linear and/or constant spring rates across the stroke distances of the pistons.

With respect to a structurally simple structure of the drive device, in another embodiment, the couple element connected with the second valve disk via a valve disk shaft is a piston rod which can be connected at the end pointing away from the valve disk with a lift stop extension leading out of the drive device housing to the outside. This lift stop extension can represent a visual or controllable display of the lift positions of the drive device. The couple element connected with the first valve disk via a pressure compensation piston of the valve disk, however, can be a sleeve receiving the piston rod. Driving stops for a passive spring assembly, the third piston and either the piston rod and/or the second piston are provided at the sleeve. The two couple elements have multiple functions as they are not only employed for an optionally changing transmission of the movements and forces of the pistons, but also take care of the connection between respectively active components of the drive device and the double seat valve.

Finally, in a particularly suitable embodiment of the drive device, a concept was chosen in which the two couple elements and the lift stop extension are replaceable exchange components, for example of a kit, for selectively adapt the drive device to the respective double seat valve type. The types of double seat valves controllable with the drive device after some modification are those which either comprise a second valve disk with an axial or an axial and a radial seal (aseptic double seat valve) or a second valve disk with an only radial seal in the seat. With the exchange component kit, the drive device can thus be optionally used for each double seat valve type. However, this shall not exclude to design the drive device from the beginning for only one double seat valve type and to omit the exchange option. Of course, the sizes of the admission areas of the pistons and the respective stroke distances in the drive device are adapted to the overall size of the respectively controlled double seat valve, and also to the pressure conditions in the flow paths.

BRIEF DESCRIPTION OF THE DRAWINGS

With reference to the drawings, embodiments of the subject matter of the disclosure will be illustrated. In the drawings.

DETAILED DESCRIPTION OF THE PREFERRED EMBODIMENT

Figure 1:
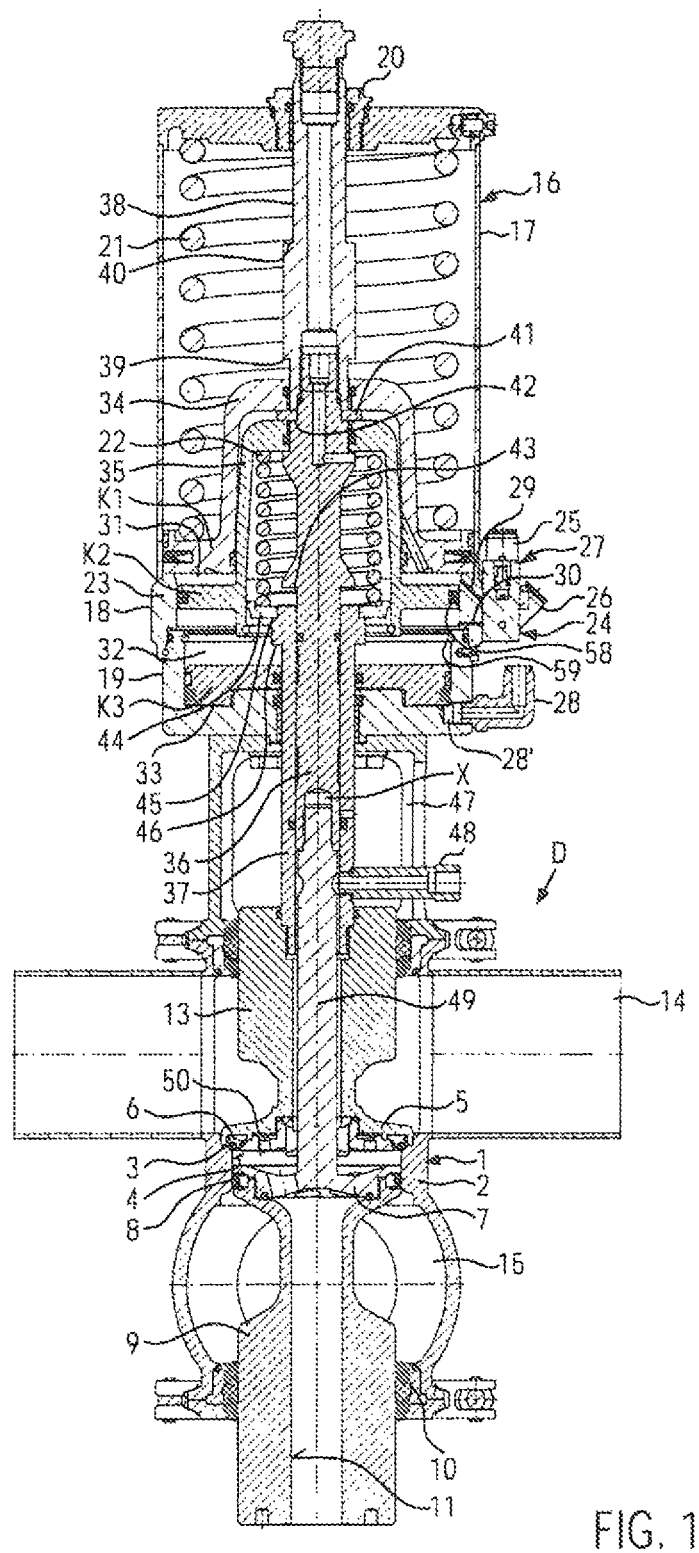
FIG. 1 shows a longitudinal section of a drive device in an unpressurized state and in an arrangement combined with a double seat valve of a first type, in a closed position of the double seat valve.

FIGS. 1 to 4 show longitudinal sections of one arrangement each of a pressure-medium actuated (compressed-air actuated) drive device A and a double seat valve D coaxially connected with it, in particular for the food industry, where the drive device A is combined in a first embodiment with the double seat valve D of a type in which a first valve disk 5 provides a seat valve function, while a second valve disk 7 provides a sliding valve function.

The double seat valve D in FIGS. 1 to 4 comprises a valve chamber 1 which defines a seat 2 between two flow paths 14, 15 which defines a for example conical face 3 for an either only axial or an axial and radial seal 6 of the first valve disk 5 (upper valve disk), and a for example cylindrical valve bore 4 for an only radial seal 8 of the second valve disk 7 (lower valve disk 7). The lower valve disk 7 is preferably connected with a pressure compensation piston 9 which is movable in a sealed manner in the valve chamber 1 in a seal 10 and contains an outlet channel 11 which communicates with a leakage space 50 between the first and the second valve disks 5, 7 via passages 12 in the second valve disk 7. The first valve disk 5 can also be connected with a pressure compensation piston 13 which extends upwards coaxially to the pressure compensation piston 9 in the direction of a common axis X of the double seat valve D and the drive device A. In the flow paths 14, 15 that can be either connected or separated by the seat 2, different pressure conditions can prevail in the closed position of the double seat valve D shown in FIG. 1, when the drive device A is unpressurized.

The drive device A has a single, generally pot-shaped, drive device housing 16 which can be joined e.g. from an upper housing part 17, a central housing part 18 and a lower housing part 19. In the upper end of the drive device housing 16, a screw stop 20 can be provided which permits, among other things, lift adjustments of internal components of the drive device A. The upper housing part 17 contains a spring assembly 21 of at least for example one coil spring which is supported at the upper end of the upper housing part 17 on the one hand and at a first piston K1 guided in the upper housing part 16 to be movable in a sealed manner. The spring assembly 21 is preloaded. Underneath the first piston K1 (here the main piston for the opening cycle), a second piston K2 is arranged structurally separated from it which is guided in the central housing part 18 to be movable in a sealed manner over a stroke distance in a guide ring 23 which is there for example integrally formed or inserted, the stroke distance being shorter than the stroke the second piston K2 performs during the opening cycle. The sealing and guiding diameter of the second piston K2 in the guide ring 23 is smaller than the sealing and guiding diameter of the first piston K1 in the upper housing part 17. Within at least a portion of the axial extension of the spring assembly 21, a passive spring assembly 22 of at least for example one coil spring is provided which serves, among other things, to act on the first valve disk 5 in the closing direction and relative to the second valve disk 7.

The first and second pistons K1, K2 each comprise a bell body 34, 35 at the side pointing away from the double seat valve D. The bell bodies 34, 35 are inserted into each other like a telescope such that the bell body 35 of the second piston K2 is received inside the bell body 34 of the first piston K1 and defines an upper abutment for the passive spring assembly 22 which is contained in the bell body 35. The lower end of the passive spring assembly 22 is supported on a spring abutment 44 in the bell body 35. The second piston K2 has at least one radial seal 58 at the circumference which forms a sealing area with the guide ring 23, while a seal of the first piston K1 at the circumference defines a sealing area of the first piston K1 with the inner wall of the upper housing part 17. Between the first and the second pistons K1, K2, a first chamber 31 is defined by the two sealing areas. In the lower housing part 19, a third piston K3 is movable in a sealed manner, where its guiding and sealing diameter can be smaller than the guiding and sealing diameter of the second piston K2, and which defines a third chamber 33 in the lower housing part 19. Between the second and the third pistons K2 and K3, a second chamber 32 is defined.

A common valve 24 is associated to the first and the second chambers 31, 32 which is mounted, for example, laterally outside at the central housing part 18, and from which a pressure transmission path 29 leads laterally, i.e. transversely to the direction of the common axis X, through the drive device housing 16 directly into the first chamber 31, while a second pressure transmission path 30 also leads through the central housing part 18 or the guide ring 23 directly to the second chamber 32. The valve 24 is thus functionally associated to both chambers 31, 32 together and has two separate external connections 25, 26 as well as an internal shuttle valve 27 which is pressure controlled. A pressure transmission path 28' extends to the third chamber 33 from an external connection 28 which is mounted laterally, for example at the lower housing part 19.

In the embodiment of the drive device A in FIGS. 1 to 4, the second piston K2 is permanently and rigidly connected with a valve disk shaft 49 of the second valve disk 7 via a couple element 36 embodied as a piston rod, i.e. it is axially fixed between a stop ring 41 and a stop 42 of the couple element 36. In contrast, the first piston K1 and the third piston K3 can be axially adjusted relative to the couple element 36 at least within limits. Another couple element 37 in the form of a sleeve is firmly connected, e.g. screwed, to the first valve disk 5 via the pressure compensation piston 13. At the free end of the couple element 36, a lift stop extension 38 is mounted, e.g. screwed on, which extends through the screw stop 20 to the outside out of the drive device housing 16 and defines a visual and/or scannable lift position display and a lift stop. The lift stop extension 38 comprises a stop 39 oriented downwards for the upper side of the bell body 34 of the first piston K1 and a stop 40 for cooperation with the screw stop 20 and fixes the stop ring 41 at the upper end of the couple element 36. The spring abutment 44 is seated on a stop 45 of the couple element 37 which has a further stop 46 for the third piston K3 and also forms a stop for a stop 43 at the couple element 36 with its upper free end.

The drive device A or the drive device housing 16, respectively, is connected with the valve chamber 1 via a coaxial lantern housing 47 in which a cleaning medium connection 48 is arranged in the couple element 37 which communicates with a cleaning medium channel between the valve disk shaft 49, the lower end of the couple element 37 and the pressure compensation piston 13 and the leakage space 50 between the first and the second valve disks 5, 7. The cleaning medium connection 48 can be used for an external cleaning cycle, for example to clean, in the closed position of the double seat valve D shown in FIG. 1, the leakage space 50, the upper and lower sides of the first and the second valve disks 5, 7, and the valve bore wall 4 in the seat 2, the cleaning medium being discharged, together with removed dirt, via the passages 12 and the channel 11.

Figure 5:
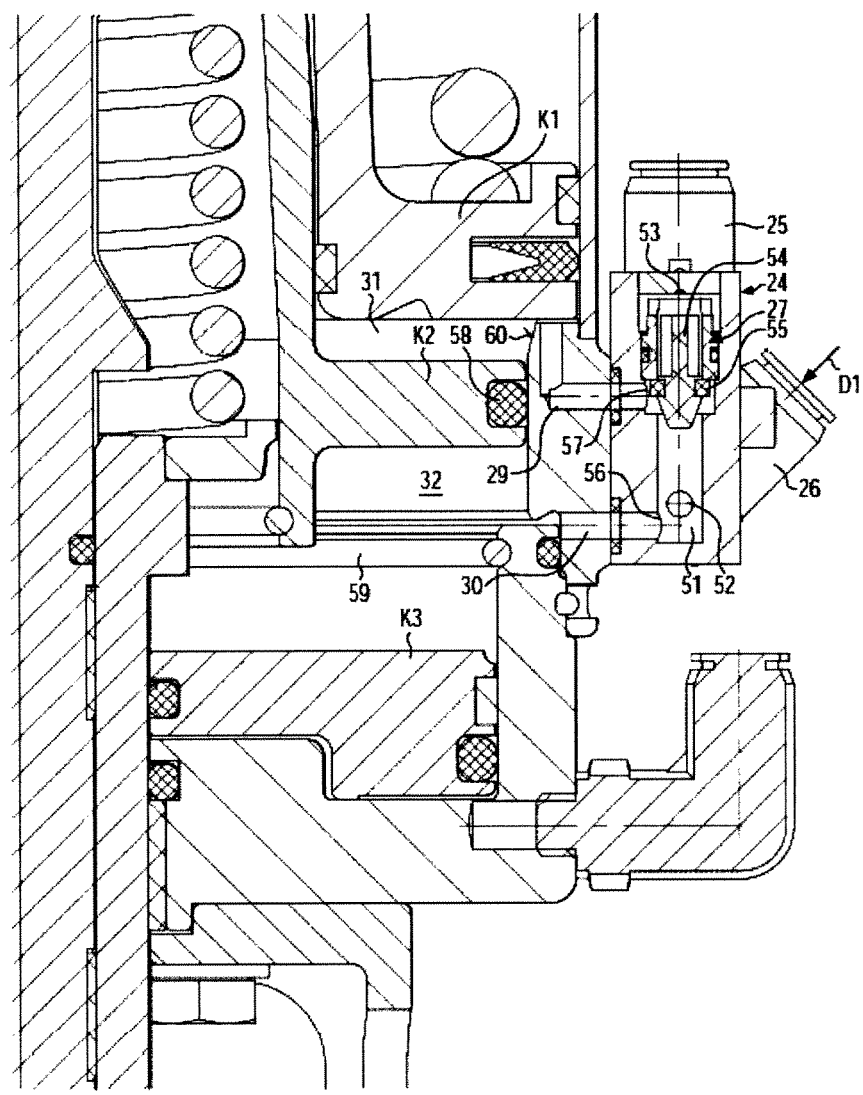
FIG. 5 shows an enlarged detail of the drive device of FIG. 1 at the beginning of the opening cycle analogously to FIG. 2.

In FIG. 5, the construction of the valve common to the first and the second chambers 31, 32 is shown in a larger scale. The valve 24 contains for the shuttle valve 27 a control chamber 51 with separate chamber outlets 56, 57 to the pressure transmission paths 30, 29 as well as separate inlets 52, 53 from the external connections 26, 25. In the control chamber 51, a control piston 54 can be axially adjusted between two switching positions in response to pressure, depending on whether pressure is admitted to the one external connection 25 or to the other external connection 26. The control piston 54 has a sealing collar 55 and shuts off the inlet 53 in the one switching position of the shuttle valve 27 shown in FIG. 5 when pressure is admitted to the external connection 26 (pressure pulse D1, while the inlet 52 is in connection with both chamber outlets 56, 57. FIG. 5 moreover shows the radial seal 58 of the second piston K2, for example an O-ring in a circumferential groove 57. The O-ring cooperates with the guide ring 23 which has at its upper side a conical insertion inclination 60 which also limits the sealing area of the second piston K2 in the guide ring 23 to the top.

Figure 6:
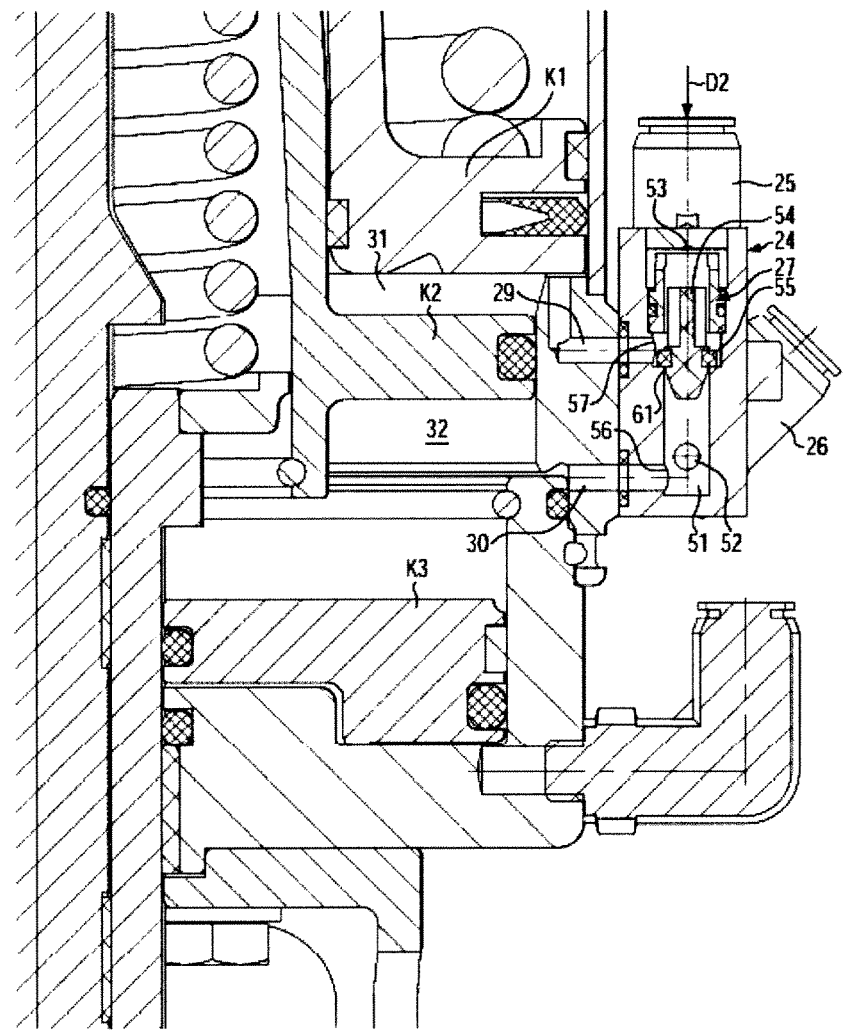
FIG. 6 shows an enlarged detail similar to that of FIG. 5 at the beginning of the cleaning cycle of the lower valve disk analogously to FIG. 3.

FIG. 6 shows the second switching position of the shuttle valve 27 during pressure medium admission of the external connection 25 with a pressure pulse D2. By the pressure pulse D2, the control piston 54 is placed with its sealing collar 55 on a sealing face 61 in the control chamber 52, so that the inlet 53 is released but separated from the inlet 52. The pressure pulse D2 is introduced via the chamber outlet 57 and the pressure transmission path 29 directly into the first chamber 31 and between the sealing areas of the first and the second pistons K1 and K2. FIG. 6 furthermore shows a stop ring 59 in the lower housing part 19 which limits the stroke distance of the third piston K3 to the top.

Instead of the valve 24 mounted to the central housing part 18 in FIGS. 1 to 6, a multi-port solenoid valve could be used which can be switched between the at least two switching positions analogously to FIGS. 5 and 6. The solenoid valve or the valve 24 could furthermore be arranged, as an alternative, at a site separate from the drive device A and be connected with the external connections 25, 26 via pressure pipes or pressure hoses.

In the closed position in FIG. 1, the passive spring assembly 22 is axially somewhat compressed or preloaded.

Figure 2:
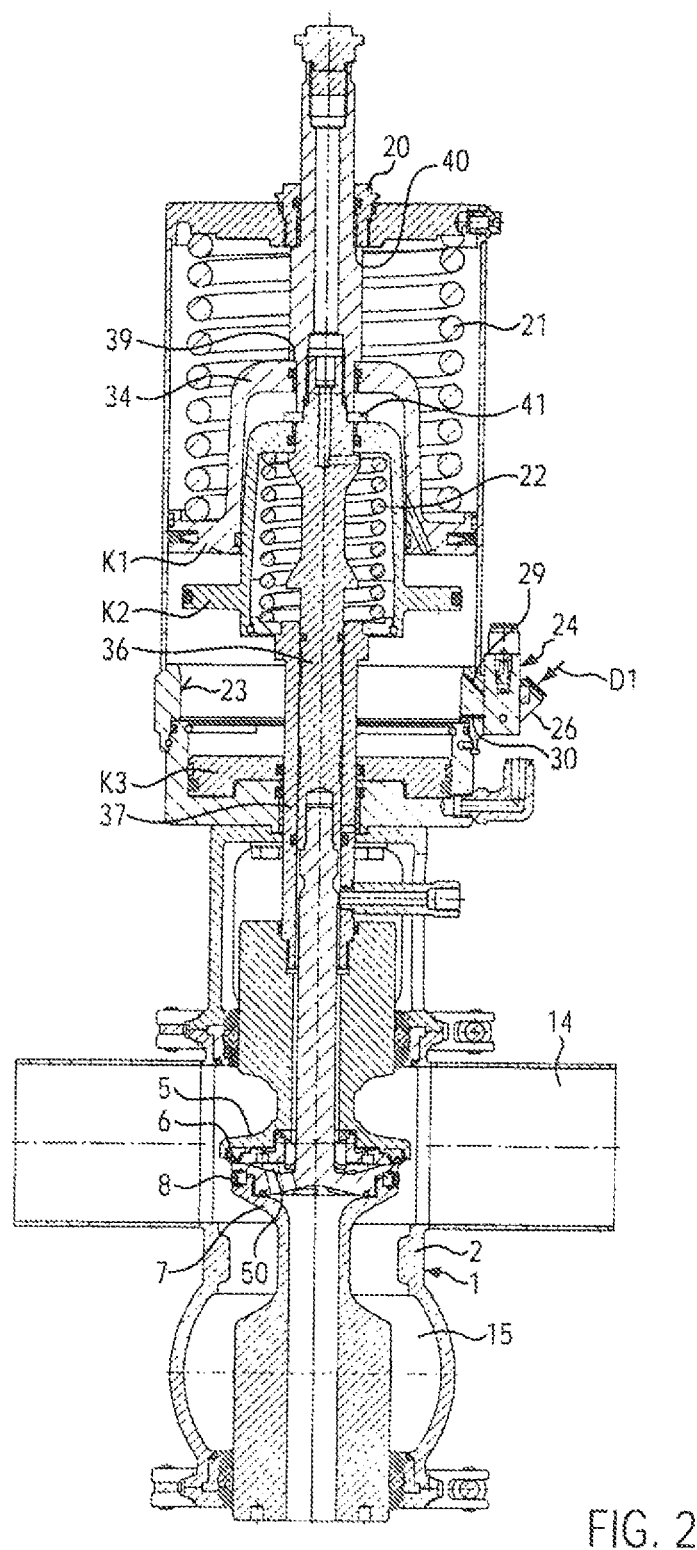
FIG. 2 shows the arrangement of FIG. 1 during or after the opening cycle of the double seat valve, respectively.

FIG. 2 shows the arrangement of FIG. 1 at the beginning of or after an opening cycle whose course will be illustrated below.

To actuate the double seat valve D during the opening cycle (FIG. 2), the pressure pulse D1 is admitted to the external connection 26 in FIG. 5 and simultaneously brought into the first and second chambers 31, 32 via both pressure transmission paths 29, 30, so that the forces of the second piston K2 are neutralized and the first piston K1 moves upwards. Via the preloaded passive spring assembly 22, the second piston K2 follows the movement of the first piston K1, where the couple element 36 pulls the second valve disk 7 upwards via the stop ring 41 until it abuts against the axial seal 6 of the first valve disk 5 and the leakage space 50 is sealed. In the further movement of the first and the second pistons K1, K2, the first and the second valve disks 5, 7 are brought into the position of FIG. 2, where the bell body 34 of the first piston K1 first performs an empty stroke to the stop 39 on the lift stop extension 38, and the lift stop extension 38 with the stop 40 finally reaches the screw stop 20. The passive spring assembly 22 is somewhat relieved in the process, while it keeps, however, the first and the second valve disks 5, 7 in mutual non-positive contact via the spring abutment 44 and the stop 45 of the couple element 37. The second piston K2 leaves the guide ring 23. The bell body 34 has departed from the bell body 35, which was stopped at the stop ring 41, until it has reached the stop 39. The spring assembly 21 is compressed. The flow path 14 is connected with the flow path 15 (opening end position in FIG. 2).

To create again the closed position of FIG. 1, the pressure pulse D1 is reduced. Thereupon, the spring assembly 21 creates the closed position, where under the action of the passive spring assembly 22, the first and second valve disks 5, 7 first remain pressed against each other until the first valve disk 5 has set down in the seat 2, before, via the bell body 34 and the stop ring 41, the spring assembly 21 shifts the couple element 36 with the second valve disk 7 further downwards to the position shown in FIG. 1, in which the first and the second valve disks 5, 7 are spaced apart forming the leakage space 50 between them.

Figure 3:
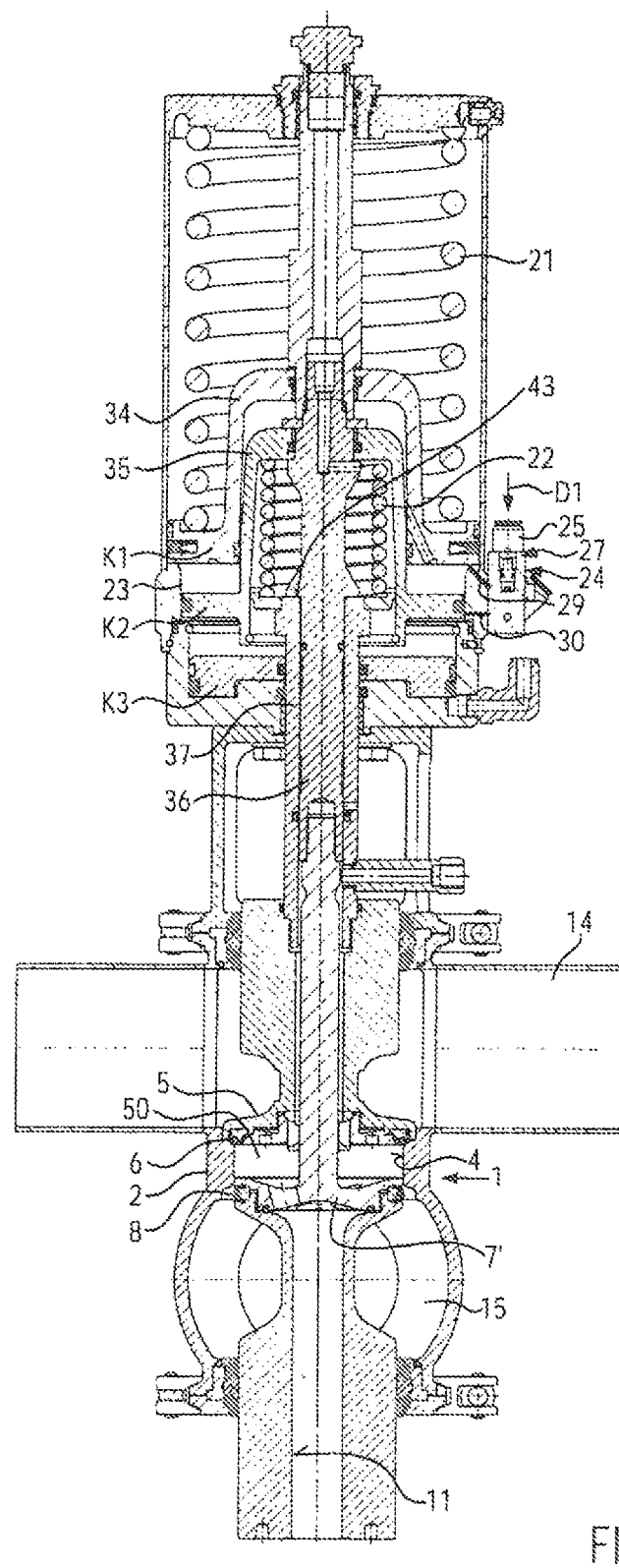
FIG. 3 shows the arrangement of FIG. 1 in a cleaning cycle of a lower or second valve disk.

Below, the course of the cleaning cycle of the second valve disk 7 shown in FIG. 3 will be illustrated with further reference to FIG. 6. Starting from the closed position of the double seat valve D shown in FIG. 1, the pressure pulse D2 is applied to the external connection 25 which brings the control piston 54 into the second switching position shown in FIG. 6. The second chamber 32 is connected with the other external connection 26 via the pressure transmission path 30 and the inlet 52, optionally to vent the second chamber or to let displaced pressure medium flow out, respectively. The pressure pulse D2 is lead directly into the first chamber 31 via the lateral pressure transmission path 29, while the second piston K2 is moved downwards under the increasing compression of the passive spring assembly 42 and drives the second valve disk 7 out of the seat 2 downwards into a defined gap position via the couple element 36. The gap position of the second valve disk 7 during the cleaning cycle is defined by the stop 43 of the couple element 36 which sets down on the upper end of the couple element 37 which is supported in the seat 2 via the first valve disk 5. Now, either cleaning medium from the flow path 15 can clean the radial seal 8, the second valve disk 7, the leakage space 50, the bottom sides of the axial seal 6 and the first valve disk 5 as well as the portion of the valve disk shaft 49 there and drain via the channel 11 together with dirt. As an alternative, an external cleaning could also be performed, for example via the cleaning connection 48 shown in FIG. 1. The flow path 14 here remains reliably isolated from the flow path 15 and the leakage space 50.

After the cleaning cycle of the second valve disk 7, which optionally has an oscillating design, the pressure pulse D2 is reduced. The passive spring assembly 22 supported via the first valve disk 5 at the seat 2 pulls the second piston K2 again into the position shown in FIG. 1 within the guide ring 23. During the cleaning cycle, the second piston K2 remains in the sealing and guiding area of the guide ring 23.

Figure 4:
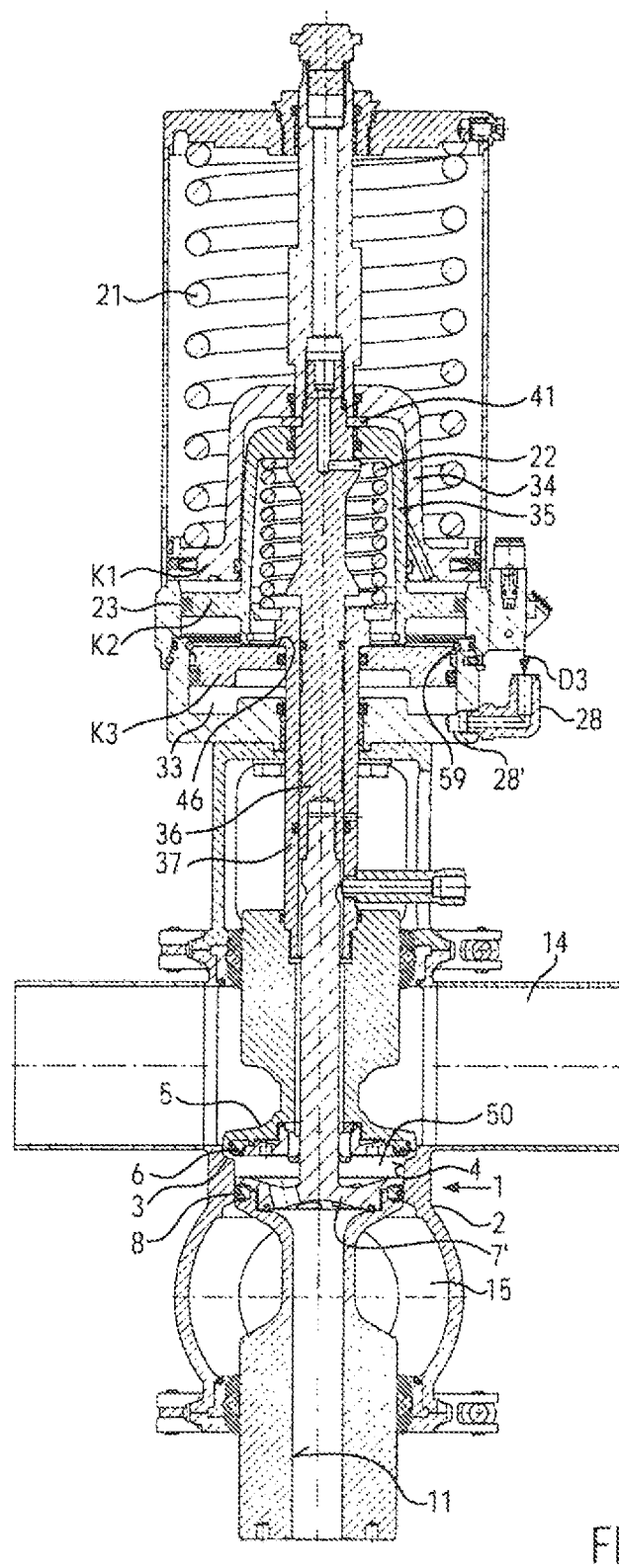
FIG. 4 shows the arrangement of FIG. 1 in a cleaning cycle of an upper or first valve disk.

Below, the course during the cleaning cycle of the first valve disk 5 will be illustrated according to FIG. 4.

Starting from the closed position of FIG. 1, a pressure pulse D3 is introduced into the external connection 28 and conducted into the third chamber 33 underneath the third piston K3 via the pressure transmission path 28'. The second valve disk 7 remains in the position in the seat 2 shown in FIG. 1 due to the spring assembly 21. The third piston K3 reaches the stop 46 of the couple element 37 and pulls the first valve disk 5 into a gap position to the top via the couple element 37, where this gap position is defined by the third piston K3 hitting the circlip 59 (FIG. 5). Cleaning medium from the flow path 14 can clean the first valve disk 5, its axial or axial and radial seal 6, the bottom side of the first valve disk 5, the face 3, the valve bore 4 to the radial seal 8 of the second valve disk 7, the upper side of the second valve disk 7 as well as a portion of its valve disc shaft 49 and flow away through the channel 11. As an alternative or in addition, external cleaning could also be performed via the cleaning medium connection 48 and through the leakage space 50 into the flow path 14.

To restore the double seat valve into the closed position shown in FIG. 1, the pressure pulse D3 is reduced, so that the compressed passive spring assembly 22 shifts the couple element 37 downwards and takes along the third piston K3 via the stop 46.

FIGS. 7 to 10 represent, analogously to FIGS. 1 to 4, however for an arrangement of another embodiment, the closed position of the double seat valve D, controlled via the drive device A (FIG. 7), the open position (FIG. 8), the cleaning cycle of the second valve disk 7' (FIG. 9) and the cleaning cycle of the first valve disk 5 (FIG. 10), where optionally also either FIGS. 5 and 6 or FIGS. 11 and 12 are to be considered for this second embodiment of the arrangement. The arrangement in FIGS. 7-10 differs from that of FIG. 1 both with respect to the drive device A and the double seat valve D combined with it.

The double seat valve in FIGS. 7 to 10 is a type which is, for example, required for aseptic conditions and in which the second valve disk 7' provides a seat valve function with an axial or an axial and radial seal 8' at a conical face 4' of the seat 2' in the valve chamber 1', analogously to the seat valve function of the first valve disk 5. In this double seat valve type, during the cleaning cycle of the second valve disk 7', the vent movement of the latter from the face 4' towards the drive device A is thus required, in contrast to the movement of the second valve disk 7 shown in FIGS. 1 to 4 during the cleaning cycle in a direction away from the drive device A. For this reason, compared to FIGS. 1 to 4, in FIG. 7 a different couple element 36' for the second valve disk 7', a different couple element 37' for the first valve disk 5, and a different lift stop extension 38' are provided in the drive device A. These components can be exchange components, for example of a kit, of the drive device A to be able to modify them selectively for the one or the other double seat valve type, but still use the other components of the drive device A.

Figure 7:
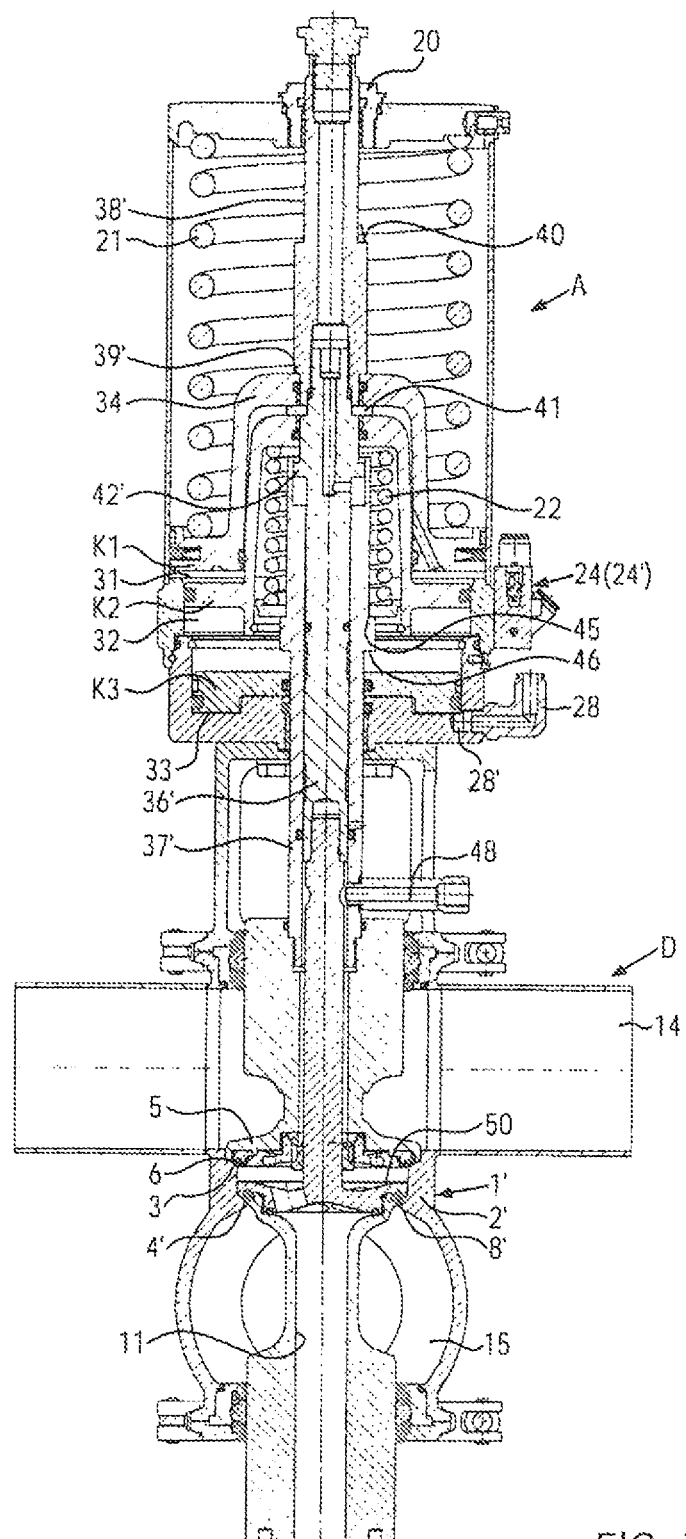
FIG. 7 shows an arrangement of the drive device in an unpressurized state combined with a double seat valve of another type, in the closed position of the double seat valve.

In FIG. 7, the couple element 37' is extended to the top to such an extent that it nearly extends to the upper end of the passive spring assembly 22 and with its upper end forms a stop for the bell body 35 of the second piston K2. The couple element 36' is embodied without the stop 43 of FIGS. 1 to 4 and comprises the stop 42' at a greater distance from the stop ring 41 than with the stop 42 in FIGS. 1 to 4. The stop ring 41 is fixed on the couple element 36' by the lift stop extension 38', however at a greater distance to the stop 42', so that the bell body 35 of the second piston K2 can perform a relative empty stroke on the couple element 36'. In contrast, the bell body 34 is fixed on the stop ring 41 by the stop 39' of the lift stop extension 38', so that the first piston K1 cannot perform an empty stroke relative to the couple element 36'. In FIGS. 7 to 10, the first piston K1 is not only the main piston for the opening cycle, but the first piston K1 also serves to perform the cleaning cycle of the lower valve disk 7', while the second piston K2 takes care that the first valve disk 5 remains pressed onto the seat 2', and the gap position of the second valve disk 7' is defined during the cleaning cycle.

Figure 11:
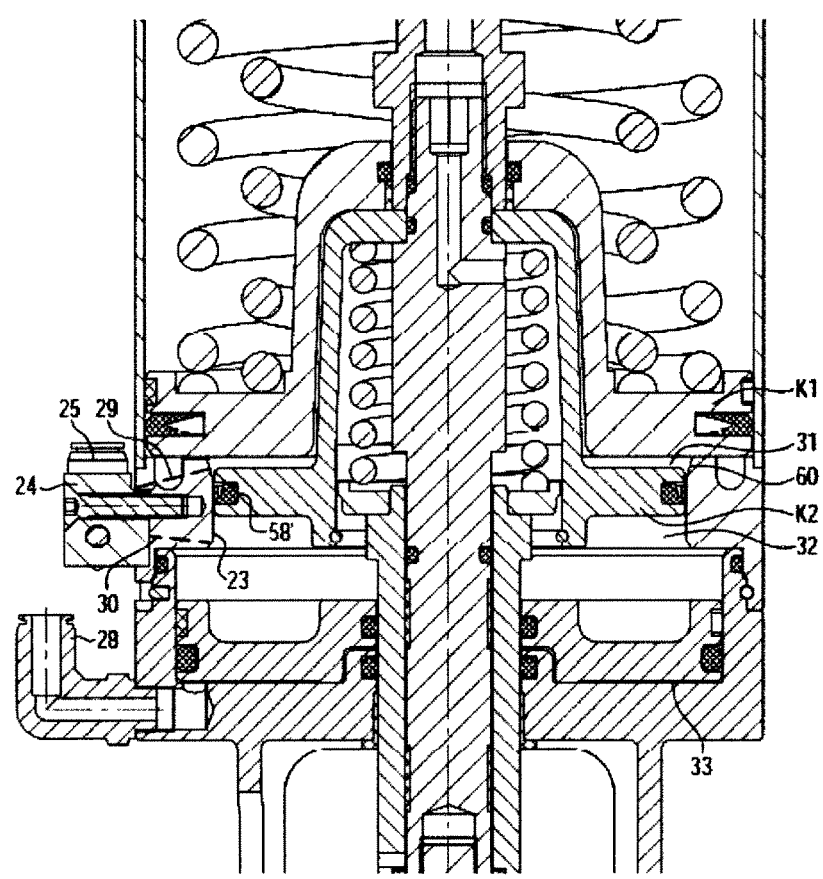
FIG. 11 shows a partial section in an enlarged representation of another embodiment of the drive device.
Figure 12:
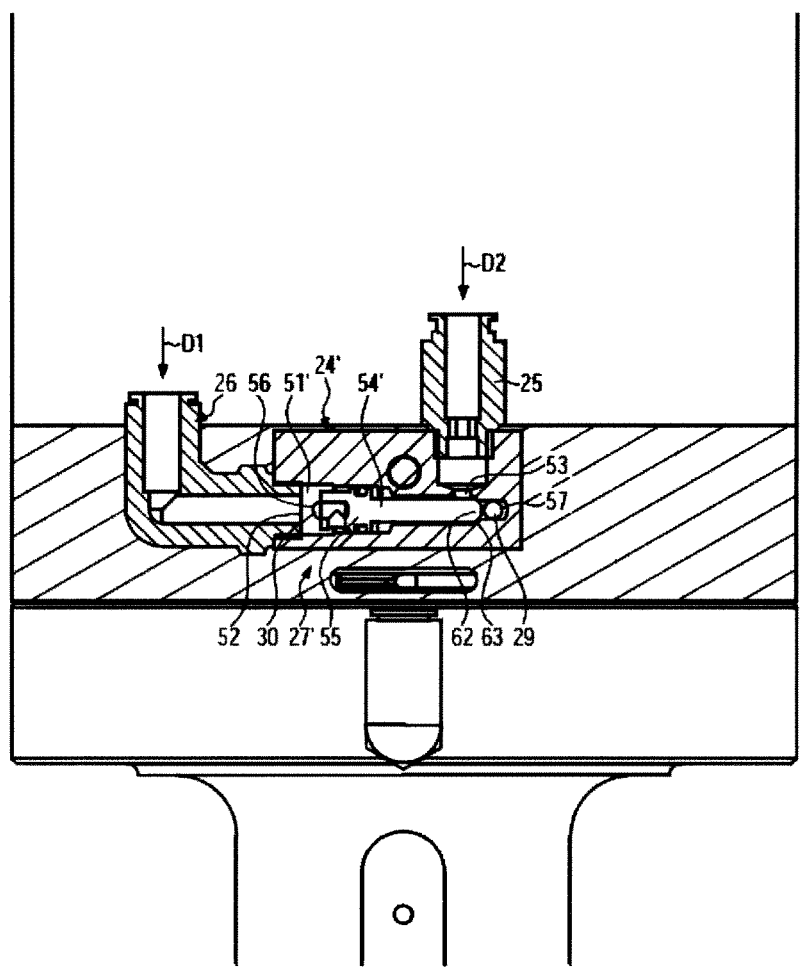
FIG. 12 shows an enlarged detail section of FIG. 11.

The valve 24 common to the first and the second chambers 31, 32 can be embodied as is shown in FIGS. 5, 6, or it is, as an alternative, embodied as the valve 24' shown in FIG. 12 with the shuttle valve 27' (or as an alternative as a multi-port solenoid valve), provided that the detail variant according to FIG. 11 is provided in the second piston K2.

In FIG. 11, different to FIG. 5, the radial seal 58 of the second piston K2 of FIG. 5 is replaced by a radial seal 58' which has a check valve effect, i.e. only seals in the direction of flow from the first chamber 31 into the second chamber 32, but is open in the direction of flow from the second chamber 32 into the first chamber 31. For example, this seal 58' is a groove sealing ring with a sealing lip which is lifted at a higher pressure in the second chamber 32 and transmits the pressure of the second chamber 32 into the first chamber 31. Therefore, the valve 24' can be designed such that in the one switching position of the shuttle valve 27' analogously to FIG. 5, not both pressure transmission paths 29, 30 are connected with the external connection 26, but the pressure transmission according to FIG. 12 is effected.

In FIG. 12, the valve 24' with its shuttle valve 27' contains the control piston 54' in the control chamber 51' which is movable in a sealed manner and in the one switching position (pressure pulse D1 in the external connection 26) separates, with its right end 62, the inlet 53 from the chamber outlet 57 to the pressure transmission path 29, and to this end cooperates with a valve seat 63 in the control chamber 51', while its sealing collar 55 isolates the inlets 53, 52 from each other, as well as the chamber outlets 57, 56. In the one switching position in FIG. 12 (pressure pulse D1 for the opening cycle of the double seat valve D), the pressure pulse D1 is only supplied to the pressure transmission path 30 and thus into the second chamber 32 (FIG. 7) and transmitted into the first chamber 31 via the radial, then open seal 58' (FIG. 11). In the other (non-depicted) switching position of the shuttle valve 27' in FIG. 12, the control piston 54' is shifted from the position shown in FIG. 12 to the left without interrupting the connection between the inlet 52 and the pressure transmission path 30, and the connection between the pressure transmission path 29 and the external connection 25 is created, so that a pressure pulse D2, applied to the external connection 25, is introduced only into the first chamber 31 via the pressure transmission path 29. This pressure pulse cannot bypass the seal 58' in the second piston K2 to the second chamber 32, so that the second piston K2 is shifted downwards.

The closed position of the double seat valve D represented in FIG. 7 is maintained by the spring assembly 21 and the passive spring assembly 22. The first and second valve disks 5, 7 are each placed in a non-positive fit. The flow paths 14, 15 are separated. Optionally, the leakage space 50 between the first and the second valve disks 5, 7' is cleaned via the cleaning medium connection 48, including the surfaces and components over which the cleaning medium flows in this area.

Figure 8:
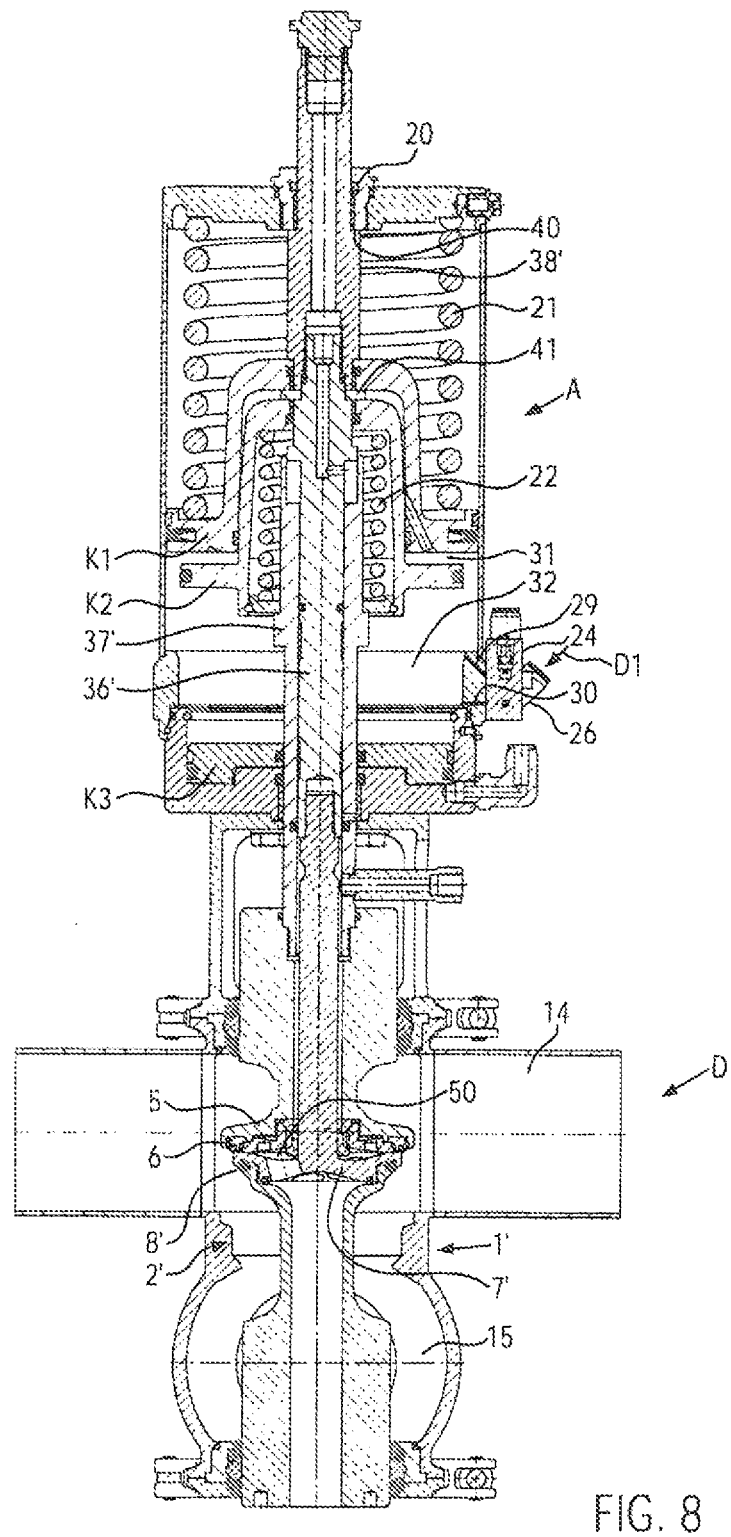
FIG. 8 shows a longitudinal section of the arrangement of FIG. 7 during or after the opening cycle of the double seat valve.

Below, the course of the opening cycle shown in FIG. 8 will be illustrated. Starting from the closed position of FIG. 7, the pressure pulse D1 is applied at the external connection 26 and transmitted via the pressure transmission path 30 into the second chamber 32 (switching position of the shuttle valve 27' in FIG. 12, or switching position of the shuttle valve 27 in FIG. 5). The first piston K1 is moved against the spring assembly 21 to the top and takes along the second valve disk 7', where the passive spring assembly 22 is somewhat relieved and presses the couple element 37' downwards, so that the first valve disk 5 still maintains its closed position until it is finally taken along by the second valve disk 7'. Then, the first and the second pistons K1, K2 together move further to the top to the open position shown in FIG. 8, while the leakage space 50 is shut off to the outside by a pressed contact between the first and the second valve disks 5, 7' thanks to the passive spring assembly 22. The flow paths 14, 15 are connected to each other. The second piston K2 drives out of the guide ring 23.

For the return to the closed position, the pressure pulse D1 is reduced, so that the spring assembly 21 brings the first and the second valve disks 5, 7' again to the bottom to the closed position of FIG. 7, and this first until the first valve disk 5 is set down, before then the second valve disk 7' is released from the first valve disk 5 by the effect of the spring assembly 21 and set down in the seat 2'.

Figure 9:
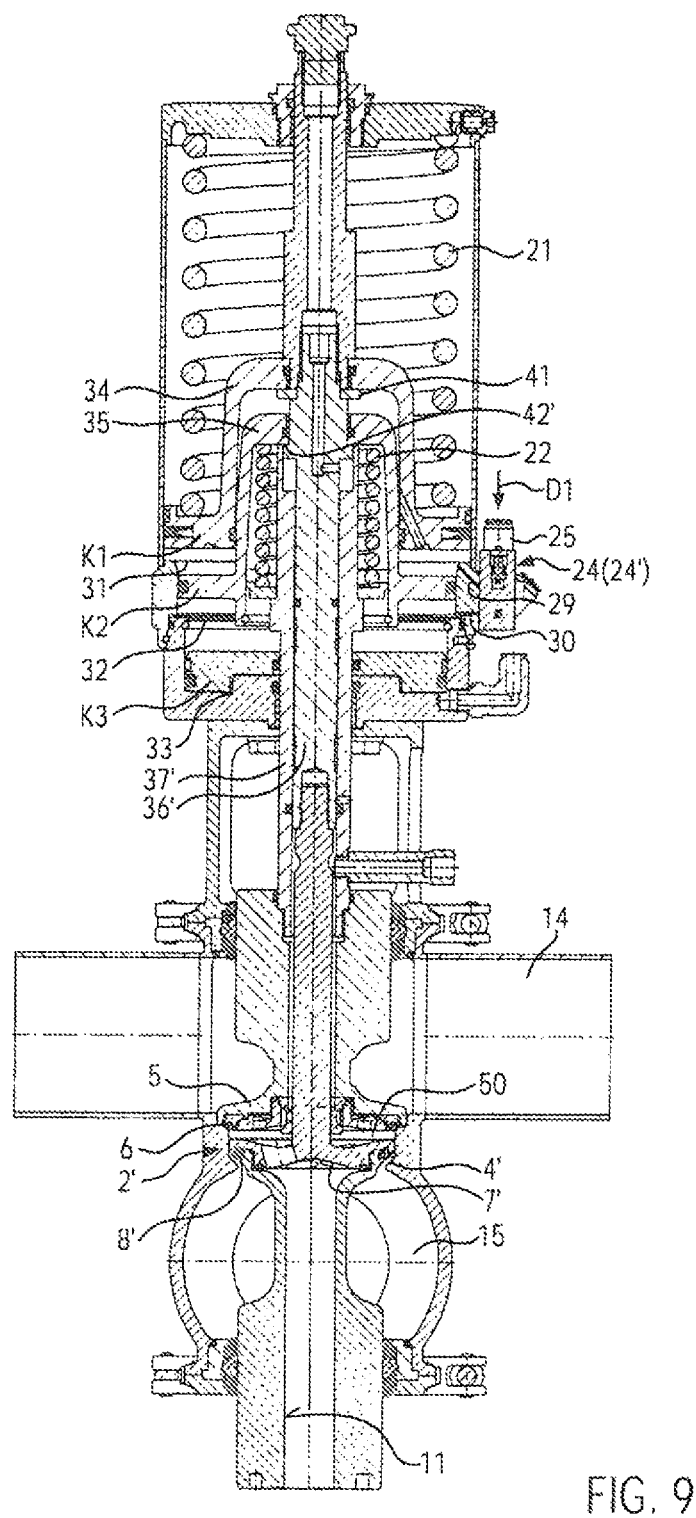
FIG. 9 shows a longitudinal section of the arrangement of FIG. 7 during the cleaning cycle of a lower or second valve disk.

With reference to FIG. 9, the course during the cleaning cycle of the second valve disk 7' will be illustrated. The pressure pulse D2 is applied at the external connection 25 of the valve 24 or 24' and introduced into the first chamber 31 at least via the pressure transmission path 29. The second piston K2 is thereby moved downwards relative to the first piston K1 supported at the spring assembly 21, while the passive spring assembly 22 is compressed on the couple element 36', until it is set down on the upper end of the couple element 27', stops and presses the first valve disk 5 against it. This stroke of the second piston K2 is performed within the guiding and sealing length of the guide ring 23, so that the first and the second chambers 31, 32 are separated, where the second chamber 32 is optionally vented via the other external connection 26. Subsequently, the first piston K1 travels upwards, where, via the couple element 36', it lifts the second valve disk 7' from the face upwards to a defined gap position. This gap position is defined by the couple element 36' coming into contact with the stop 42' at the bell body 35 of the second piston K2. Then, the first and the second pistons K1, K2 are clamped with respect to each other via the pressure pulse D2, corresponding to the representation in FIG. 9.

In the gap position of the second valve disk 7', cleaning medium can flow from the flow path 15 over the conical face, the seal 8', the bottom side of the axial seal 6 as well as the first valve disk 5, the upper side of the second valve disk 7' and a partial section of the valve disk shaft 49, and remove dirt, before the cleaning medium is drained together with dirt via the channel 11.

The return to the closed position shown in FIG. 7 is performed in that, after the reduction of the pressure pulse D2, the spring assembly 21 presses the first piston K1 downwards which presses down the couple element 36' relative to the couple element 37' via its bell body 34 and the stop ring 41 and sets down the second valve disk 7'.

The course of the cleaning cycle of the first valve disk 5 will be illustrated with reference to FIG. 10. Starting from the closed position of FIG. 7, the pressure pulse D3 is applied to the external connection 28 and conducted laterally directly into the third chamber 33 via the pressure transmission path 28'. The third piston K3 travels upwards until it stops at the stop 46 of the couple element 37' and lifts the couple element 37' and the first valve disk 5 away from the conical face 3 to a defined gap position. This gap position is defined by the third piston K3 stopping at the circlip 59. The spring assembly 21 maintains the second valve disk 7' in the closed position via the couple element 36'. Now, cleaning medium from the flow path 14 can flow over the first valve disk 5, the seal 6, the conical face 3, the inner wall of the seat 2' and the surfaces of the first and the second valve disks 5, 7' as well as a section of the valve disk shaft 49, and remove dirt and drain together with the dirt through the channel 11. As an alternative, external cleaning could also be performed using the cleaning medium connection 48 through the leakage space 50 into the flow path 14.

However, to avoid contaminations of the flow paths during cleaning processes, in the cleaning cycles of the first and the second valve disks 5, 7, 7', an internal cleaning from the flow path 14 or 15 each through the leakage space 50 into the channel 11 is preferred.

Figure 10:
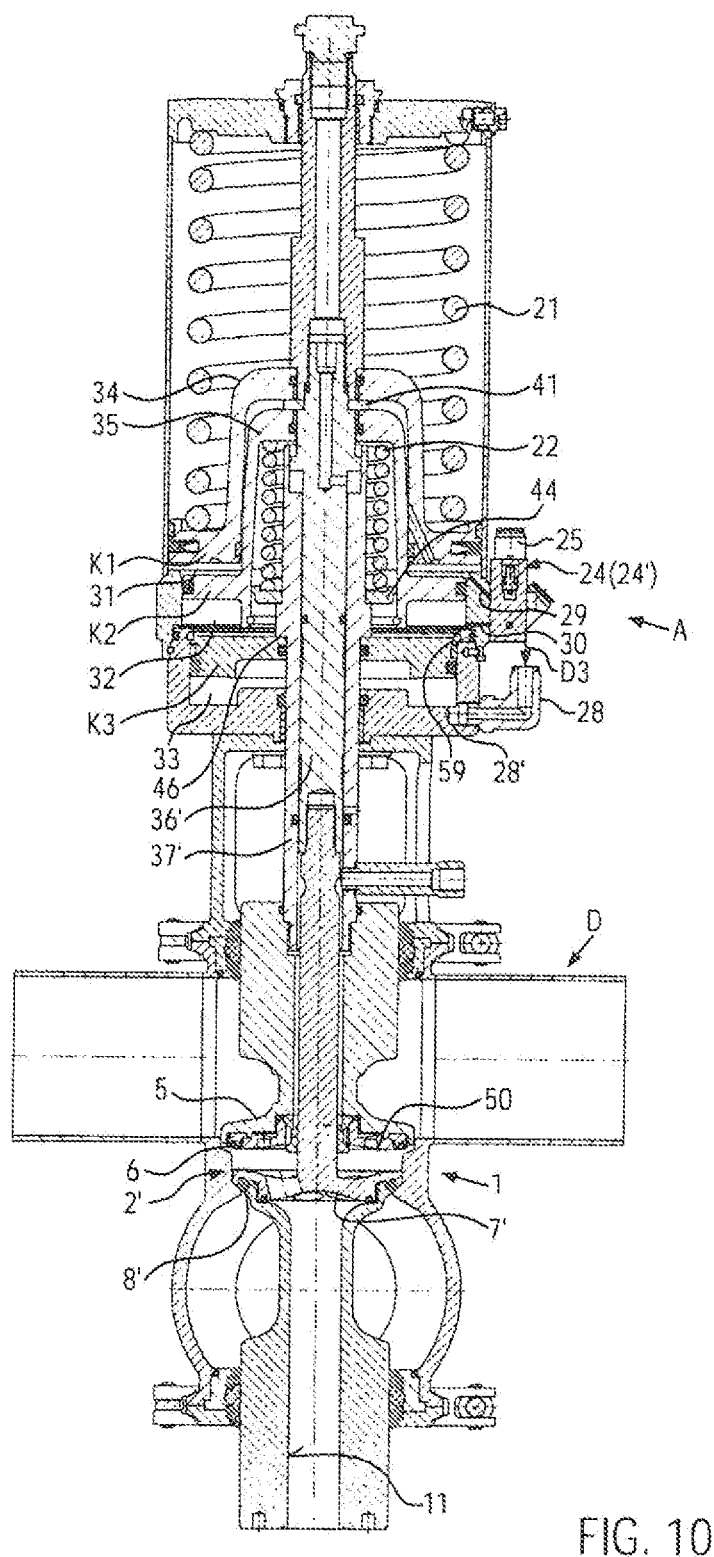
FIG. 10 shows a longitudinal sectional view of the arrangement of FIG. 7 during the cleaning cycle of an upper or first valve disk of the double seat valve.

The restoration from the cleaning cycle of FIG. 10 into the closed position is effected by the passive spring assembly 22 pressing, after the reduction of the pressure pulse D3, the couple element 37' downwards and taking along the third piston K3 via the stop 46 of the couple element 37' until the first valve disk 5 has set down.

The invention claimed is:

1. A drive device for a double seat valve comprising in a valve chamber between flow paths, a seat and first and second valve disks linearly adjustable relative to each other and together relative to the seat, the drive device comprising:
   a drive device housing;
   a first piston;
   a second piston; and
   a third piston,
   wherein the first, second, and third pistons are provided in the drive device housing and are movable in a sealed manner by alternating pressure pulses with a pressure medium for initiating an opening cycle of both valve disks, a cleaning cycle of the first valve disk, and a cleaning cycle of the second valve disk,
   wherein the pistons can be selectively connected with at least one of two couple elements connected to the first and the second valve disks so as to transmit movements,
   wherein two or more pressure transmission paths lead into the drive device housing to chambers defined by the pistons,
   wherein the second piston is guided in a sealed manner, separated from the first piston, in the drive device housing containing the first piston,
   wherein sealing areas of the first and the second pistons define a first chamber and a second chamber in the drive device housing, and
   wherein, for the cleaning cycle of the second valve disk, at least one pressure transmission path leads laterally and transversely to a common axis of the drive device housing and the valve chamber into the drive device housing and directly at least into the first chamber.

2. The drive device according to claim 1, wherein the drive device housing is divided into at least one upper housing part and one central housing part,
   wherein a guide ring with a smaller guiding and sealing diameter for the second piston than a guiding and sealing diameter of the first piston in the upper housing part is provided in the central housing part, and
   wherein the at least one pressure transmission path at least to the first chamber ends directly in the first chamber laterally through the central housing part or through the guide ring.

3. The drive device according to claim 2, wherein an axial sealing and guiding length of the guide ring is shorter than a shift stroke of the second piston during the opening cycle of the double seat valve.

4. The drive device according to claim 2, wherein the guide ring comprises a conical introduction inclination for the second piston.

5. The drive device according to claim 2, wherein the drive device housing comprises a lower housing part for the third piston joined with the central housing part and a third chamber, and
   wherein a guiding and sealing diameter of the third piston in the lower housing part is identical to or smaller than the guiding and sealing diameter of the second piston.

6. The drive device according to claim 1, wherein sealing areas of the second and the third pistons together define the second chamber.

7. The drive device according to claim 6, wherein separate pressure transmission paths laterally lead through the guide ring and a lower housing part each directly into the second chamber and a third chamber.

8. The drive device according to claim 1, wherein pressure transmission paths to the first and second chambers start from a common valve which comprises a first and a second separate external connection and a pressure-controlled shuttle valve.

9. The drive device according to claim 8, wherein the pressure-controlled shuttle valve contains a control piston movable in a sealed manner in a control chamber separately communicating with the external connections and via chamber outlets with the first and the second chambers,
  wherein the control piston can be switched, in response to a pressure admission to the first or the second external connection, between a first and a second switching position,
  wherein the first switching position connects the first external connection simultaneously with the two chamber outlets to the first and the second chambers, and
  wherein the second switching position connects the chamber outlet to the first chamber with the second external connection and the chamber outlet to the second chamber with the first external connection.

10. The drive device according to claim 8, wherein the pressure-controlled shuttle valve contains a control piston movable in a sealed manner in a control chamber separately communicating with the first and second external connections and via chamber outlets with the first and second chambers,
  wherein the control piston can be switched between a first and a second switching position in response to a pressure admission to the first or the second external connection,
  wherein the first switching position connects the chamber outlet to the second chamber with the first external connection and shuts off the chamber outlet to the first chamber to the second external connection, and
  wherein the second switching position connects the chamber outlet to the second chamber with the first external connection and the chamber outlet to the first chamber with the other external connection.

11. The drive device according to claim 1, wherein the first and the second pistons comprise, at their sides pointing away from the valve chamber, bell bodies interlocking like a telescope,
  wherein the bell body of the second piston, arranged inside the bell body of the first piston, contains a passive spring assembly acting in a closing position of the first valve disk to the seat, and
  wherein the passive spring assembly extends in the axial direction at least over a portion of its axial extension within a closing spring assembly which, in the drive device housing, acts on the first piston in a closing direction of both valve disks.

12. The drive device according to claim 1, further comprising a plurality of driving stops for a passive spring assembly, the third piston, and either a piston rod or the second piston,
  wherein the couple element connected with the second valve disk via a valve disk shaft is the piston rod whose end pointing away from the valve disk is connected with a lift stop extension guided out of the drive device housing, and
  wherein the couple element connected with the first valve disk via a pressure compensation piston of the valve disk, is a sleeve receiving the piston rod.

13. The drive device according to claim 12, wherein the two couple elements and the lift step extension are replaceable exchange components configured to selectively adapt the drive device to
  a double seat valve comprising a second valve disk with an axial or an axial and radial seal, or
  a double seat valve comprising a second valve disk with an only radial seal,
  wherein the seals are provided in or at the seat.

14. The drive device according to claim 8, wherein the common valve is mounted laterally outside at the drive device housing or at the control housing post.

15. The drive device according to claim 9, wherein in the first switching position the control piston shuts off the second external connection to the chamber outlets.

16. The drive device according to claim 12, wherein the lift stop extension is guided out of the drive device housing to the outside.

17. The drive device according to claim 10, wherein the sealing area of the second piston comprises a seal which shuts off in a direction of flow from the first to the second chamber and is open in an opposite direction of flow.

18. The drive device according to claim 17, wherein the seal is a ring groove seal arranged in a ring groove of the second piston.

19. A double seat valve, comprising the drive device according to claim 1, and configured to be controlled by the drive device,
  wherein the first valve disk comprises, configured to perform a seat valve function, an axial or an axial and radial seal on the seat, and
  wherein the second valve disk comprises, configured to perform a sliding valve function, a radial seal in the seat.

20. The double seat valve according to claim 19, wherein the second valve disk comprises the radial seal in the seat, and
  wherein the radial seal is configured to be driven out of the seat during the cleaning cycle by pressure admission to the first chamber via the second piston in a direction pointing away from the drive device housing while the first valve disk closes the seat.

21. The double seat valve according to claim 19, wherein the first and the second valve disks in the valve chamber are pressure-compensated with respect to pressures in the flow paths.

22. The double seat valve according to claim 19, wherein the second valve disk comprises (i) the axial seal or (ii) the axial seal and the radial seal at or in the seat, and
  wherein the seals are configured to be moved to a defined gap position in the seat during the cleaning cycle by pressure admission to the first chamber via the first piston, while the first valve disk closes the seat, in the direction towards the drive device housing.

23. A double seat valve, comprising the drive device according to claim 1, and configured to be controlled by the drive device,
  wherein the first valve disk comprises, configured to perform a seat valve function, an axial or an axial and radial seal on the seat, and
  wherein the second valve disk comprises, configured to perform a sliding valve function, an axial or an axial and radial seal in the seat.

* * * * *